United States Patent
Murakami et al.

(10) Patent No.: US 10,425,482 B2
(45) Date of Patent: Sep. 24, 2019

(54) INFORMATION MANAGEMENT DEVICE, LOCAL NETWORK SYSTEM, INFORMATION MANAGEMENT METHOD, AND INFORMATION MANAGEMENT PROGRAM

(71) Applicant: SUMITOMO ELECTRIC INDUSTRIES, LTD., Osaka-shi, Osaka (JP)

(72) Inventors: Kenichi Murakami, Osaka (JP); Yoji Okada, Osaka (JP); Yoshizo Tanaka, Osaka (JP); Takashi Yamamoto, Osaka (JP); Hirotsugu Yamamoto, Osaka (JP); Kiyoshi Kobayashi, Kyoto (JP); Kazuto Yano, Kyoto (JP); Masayuki Ariyoshi, Kyoto (JP); Tomohiro Miyasaka, Kyoto (JP); Mariko Sekiguchi, Kyoto (JP); Yafei Hou, Kyoto (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 670 days.

(21) Appl. No.: 14/905,980

(22) PCT Filed: Nov. 14, 2014

(86) PCT No.: PCT/JP2014/080187
§ 371 (c)(1),
(2) Date: Jan. 19, 2016

(87) PCT Pub. No.: WO2015/079933
PCT Pub. Date: Jun. 4, 2015

(65) Prior Publication Data
US 2016/0156716 A1    Jun. 2, 2016

(30) Foreign Application Priority Data

Nov. 26, 2013   (JP) .................................. 2013-244165

(51) Int. Cl.
*H04L 29/08* (2006.01)
*H04W 4/90* (2018.01)
(Continued)

(52) U.S. Cl.
CPC ...... *H04L 67/1097* (2013.01); *H04L 12/2827* (2013.01); *H04W 4/043* (2013.01); *H04W 4/90* (2018.02)

(58) Field of Classification Search
CPC .......... H04L 12/2827; H04L 67/1097; H04W 4/043; H04W 4/90
See application file for complete search history.

(56) References Cited

U.S. PATENT DOCUMENTS 6,804,672 B1 * 10/2004 Klein ................ G06F 17/30345
7,711,475 B1 *  5/2010 Cona ................... G01C 21/3415
                                                                 701/415

(Continued)

FOREIGN PATENT DOCUMENTS

JP    H10-240660 A      9/1998
JP    2000-305836 A    11/2000
(Continued)

*Primary Examiner* — Todd L Barker
(74) *Attorney, Agent, or Firm* — Drinker Biddle & Reath LLP

(57) ABSTRACT

Provided is an information management device including: a communication information obtaining unit configured to obtain communication information about a communication state in an internal network inside a building; and an update determination unit configured to determine a start of updating process by an information updating unit, based on the communication information obtained by the communication information obtaining unit, wherein the information updat-
(Continued)

ing unit obtains information from an external network outside the building and performs the updating process for storing the obtained information as local information into a storage device which is accessible, not via the external network, by a terminal device connected to the internal network.

9 Claims, 10 Drawing Sheets

(51) Int. Cl.
*H04L 12/28* (2006.01)
*H04W 4/04* (2009.01)

(56) References Cited

U.S. PATENT DOCUMENTS

| | | | |
|---|---|---|---|
| 8,116,327 B2* | 2/2012 | Schuette | H04L 43/00 370/230.1 |
| 8,509,071 B1* | 8/2013 | Narayanaswamy | H04L 41/5025 370/230 |
| 9,642,001 B2* | 5/2017 | Jang | H04W 8/22 |
| 9,747,784 B2* | 8/2017 | Norp | G08B 27/006 |
| 2011/0029385 A1* | 2/2011 | Engel | G06Q 30/02 705/14.53 |
| 2011/0071880 A1* | 3/2011 | Spector | H04W 4/90 340/573.1 |
| 2011/0301890 A1* | 12/2011 | Shirriff | G01R 31/371 702/63 |

FOREIGN PATENT DOCUMENTS

| | | |
|---|---|---|
| JP | 2005-086323 A | 3/2005 |
| JP | 2005-173876 A | 6/2005 |
| JP | 4638756 B2 | 2/2011 |
| WO | WO-2013/102962 A1 | 7/2013 |

* cited by examiner

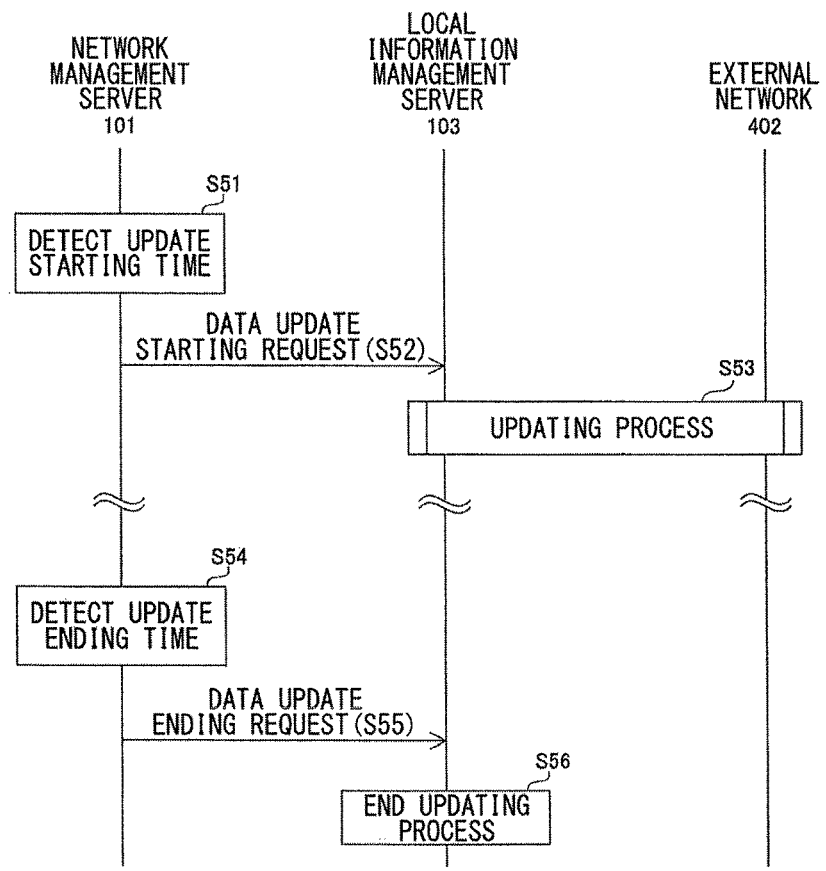

INFORMATION MANAGEMENT DEVICE, LOCAL NETWORK SYSTEM, INFORMATION MANAGEMENT METHOD, AND INFORMATION MANAGEMENT PROGRAM

TECHNICAL FIELD

The present invention relates to an information management device, a local network system, an information management method, and an information management program. In particular, the present invention relates to an information management device, a local network system, an information management method, and an information management program which provide persons being in a building with information obtained from an external network outside the building.

BACKGROUND ART

Conventionally, there have been proposed communication systems in which, in the case of occurrence of a disaster, safety information of a person who is in the disaster area is transmitted to his/her family and the like. For example, PATENT LITERATURE 1 (Japanese Patent No. 4638756) discloses the following technology. That is, an information communication system includes a central processing unit, a plurality of base stations, and a plurality of terminal devices, and in the information communication system, the central processing unit includes: a damage situation database for registering a disaster state of each district; a terminal positional information database for registering each of districts where a plurality of base stations or a plurality of terminal devices exist; and a safety information disclosure permission database in which the owners of the plurality of terminal devices set the other parties to which safety information is transmitted. On the occurrence of a disaster, the central processing unit selects a terminal device of an owner whose safety information is to be transmitted based on the affected state database and the terminal positional information database, and transmits the safety information of the district corresponding to the selected terminal device to the other party to which the transmission of the safety information is permitted based on the safety information disclosure permission database.

CITATION LIST

Patent Literature

PATENT LITERATURE 1: Japanese Patent No. 4638756

SUMMARY OF INVENTION

Technical Problem

On the occurrence of a disaster, in many cases, persons outside the disaster area need safety information, whereas persons in the disaster area also need various types of information such as transportation infrastructure. However, when many people are crowded in a limited space such as a shelter, and these many people respectively try to access an external network by use of their terminal devices and the like, there is a possibility that congestion occurs in an internal network provided inside the building such as a shelter, access to the external network is restricted, and information cannot be obtained. In addition, communication equipment may be damaged due to the disaster, and this may result in further difficulty in stable provision of information to persons being in the building such as a shelter.

The present invention has been made in order to solve the problem described above. An object of the present invention is to provide an information management device, a local network system, an information management method, and an information management program which can stably provide information to persons being in a building.

Solution to Problem (1) In order to solve the above problem, an information management device according to an aspect of the present invention includes: a communication information obtaining unit configured to obtain communication information about a communication state in an internal network inside a building; and an update determination unit configured to determine a start of updating process by an information updating unit, based on the communication information obtained by the communication information obtaining unit, wherein the information updating unit obtains information from an external network outside the building and performs the updating process for storing the obtained information as local information into a storage device which is accessible, not via the external network, by a terminal device connected to the internal network.

(8) In order to solve the above problem, a local network system according to an aspect of the present invention includes: a network management device configured to obtain communication information about a communication state in an internal network inside a building; and a local information management device configured to obtain information from an external network outside the building, and configured to perform an updating process for storing the obtained information as local information into a storage device which is accessible, not via the external network, by a terminal device connected to the internal network. In the local network system, based on the obtained communication information, the network management device transmits, to the local information management device, a data update starting request for giving an instruction to start the updating process, and the local information management device receives the data update starting request and starts the updating process.

(9) In order to solve the above problem, an information management method according to an aspect of the present invention is to be performed in an information management device, and includes: a step of obtaining communication information about a communication state in an internal network inside a building; and a step of obtaining information from an external network outside the building, and determining, based on the obtained communication information, a start of an updating process for storing the obtained information as local information into a storage device which is accessible, not via the external network, by a terminal device connected to the internal network.

(10) In order to solve the above problem, an information management method according to another aspect of the present invention is to be performed in a local network system, the local network system including a network management device and a local information management device, and the method includes: a step in which the network management device obtains communication information about a communication state in an internal network inside a building; a step in which the network management device transmits a data update starting request to the local information management device based on the obtained communication information; and a step in which the local information management device receives the data update starting request, obtains information from an external network outside the building, and starts an updating process for storing the obtained information as local information into a storage device which is accessible, not via the external network, by a terminal device connected to the internal network.

(11) In order to solve the above problem, an information management program according to an aspect of the present invention is to be used in an information management device, and causes a computer to execute: a step of obtaining communication information about a communication state in an internal network inside a building; and a step of obtaining information from an external network outside the building, and determining, based on the obtained communication information, a start of an updating process for storing the obtained information as local information into a storage device which is accessible, not via the external network, by a terminal device connected to the internal network.

It is understood that the program can be embodied as a storage medium (recording medium) in which the program is stored (recorded) therein (the same applies below).

(12) In order to solve the above problem, an information management program according to another aspect of the present invention is to be used in a local network system, the local network system including a network management device and a local information management device, and the program causes a computer to execute: a step in which the network management device obtains communication information about a communication state in an internal network inside a building; a step in which the network management device transmits a data update starting request to the local information management device based on the obtained communication information; and a step in which the local information management device receives the data update starting request, obtains information from an external network outside the building, and starts an updating process for storing the obtained information as local information into a storage device which is accessible, not via the external network, by a terminal device connected to the internal network.

The present invention can be realized not only as an information management device that includes such a characteristic processing unit, but also as a semiconductor integrated circuit that realizes a part or the entirety of the information management device.

Also, the present invention can be realized not only as a local network system that includes such a characteristic processing unit, but also as a semiconductor integrated circuit that realizes a part or the entirety of the local network system.

Advantageous Effects of Invention

According to the present invention, information can be stably provided to persons being in a building.

BRIEF DESCRIPTION OF DRAWINGS

FIG. 7 is a sequence diagram showing an operation procedure (Modification 2) performed when a start of the updating process of local information in the local network system according to the embodiment of the present invention.

FIG. 8 shows one example of a table stored in a table storage unit of the local information management server in the local network system according to the embodiment of the present invention.

DESCRIPTION OF EMBODIMENTS

Figure 1:
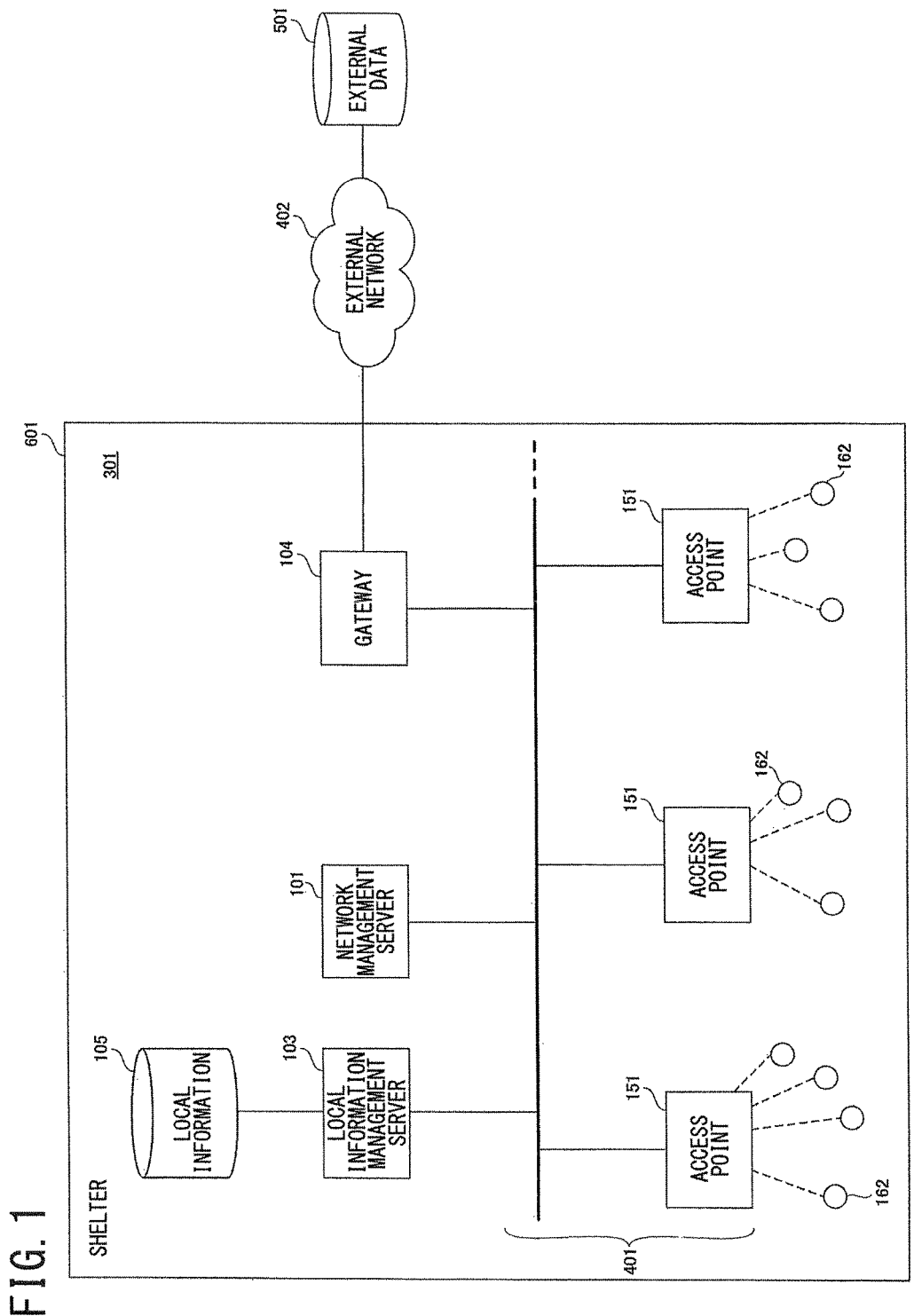
FIG. 1 shows a configuration of a local network system according to an embodiment of the present invention.

First, contents of the embodiment of the present invention will be listed for description.

(1) An information management device according to an embodiment of the present invention includes: a communication information obtaining unit configured to obtain communication information about a communication state in an internal network inside a building; and an update determination unit configured to determine a start of updating process by an information updating unit, based on the communication information obtained by the communication information obtaining unit, wherein the information updating unit obtains information from an external network outside the building and performs the updating process for storing the obtained information as local information into a storage device which is accessible, not via the external network, by a terminal device connected to the internal network.

Thus, with the configuration in which the information obtained from the external network is stored as the local information in the storage device, even in a state where access to the external network is restricted, information stored in the storage device can be provided to persons being in the building. In addition, with the configuration in which the information stored in the storage device is updated, information that could change over time, such as information indicating the state of the disaster, can be provided to persons being in the building.

Further, with the configuration in which a start of the updating process is determined based on the communication information, the updating process can be started at an appropriate timing in accordance with the communication state in the internal network. Thus, communication in the internal network can be stabled and information can be stably provided to persons being in the building.

(2) Preferably, the communication information obtaining unit obtains communication information about access to the external network from the internal network.

In this configuration, for example, access to the external network from the terminal device connected to the internal network is allowed in preference, and the updating process is performed while the communication amount of such access is small, whereby access to the external network from persons being in the building can be prevented from being restricted due to the updating process.

(3) Preferably, the update determination unit determines a start of the updating process, based on a current time and the communication information.

Thus, with the configuration in which a start of the updating process is determined by use of the current time in addition to the communication information, it is possible to prevent the updating process from being started in a state where the communication amount is only temporarily reduced, and it is possible to perform the updating process in a time zone where the communication amount is continuously small such as during nighttime.

(4) Preferably, the information management device further includes the information update unit, and the information update unit stores, as the local information, information that includes a predetermined word, in preference into the storage device.

With this configuration, information in greater need can be stored in preference in the storage device. Moreover, various types of information that includes words of higher relevance can be collectively received from the external network, to be stored in the storage device.

(5) Preferably, the information management device further includes the information update unit, and the information update unit stores, as the local information, information having a large number of accesses from the terminal device, in preference into the storage device.

With this configuration, information actually obtained by persons in the building can be stored in preference in the storage device, as information in greater need.

(6) Preferably, the information management device further includes an access control unit configured to determine whether to permit access from the terminal device to the external network.

With this configuration, optimum control of the updating process and the communication amount in the internal network can be realized.

(7) More preferably, when the access control unit does not permit the access from the terminal device to the external network and target information to be accessed by the terminal device is stored in the storage device, the access control unit performs a process of allowing the terminal device to obtain the target information in the storage device.

With this configuration, even a terminal device whose access to the external network has not been permitted because of the updating process being performed, for example, can obtain the target information which is to be accessed.

(8) A local network system according to an embodiment of the present invention includes: a network management device configured to obtain communication information about a communication state in an internal network inside a building; and a local information management device configured to obtain information from an external network outside the building, and configured to perform an updating process for storing the obtained information as local information into a storage device which is accessible, not via the external network, by a terminal device connected to the internal network. In the local network system, based on the obtained communication information, the network management device transmits, to the local information management device, a data update starting request for giving an instruction to start the updating process, and the local information management device receives the data update starting request and starts the updating process.

Thus, with the configuration in which the information obtained from the external network is stored as the local information in the storage device, even in a state where access to the external network is restricted, information stored in the storage device can be provided to persons being in the building. In addition, with the configuration in which the information stored in the storage device is updated, information that could change over time, such as information indicating the state of the disaster, can be provided to persons being in the building.

Further, with the configuration in which a start of the updating process is determined based on the communication information, the updating process can be started at an appropriate timing in accordance with the communication state in the internal network. Thus, communication in the internal network can be stabled and information can be stably provided to persons being in the building.

(9) An information management method according to an embodiment of the present invention is to be performed in an information management device. The method includes: a step of obtaining communication information about a communication state in an internal network inside a building; and a step of obtaining information from an external network outside the building, and determining, based on the obtained communication information, a start of an updating process for storing the obtained information as local information into a storage device which is accessible, not via the external network, by a terminal device connected to the internal network.

In this manner, by storing the information obtained from the external network as the local information in the storage device, even in a state where access to the external network is restricted, information stored in the storage device can be provided to persons being in the building. In addition, by the information stored in the storage device being updated, information that could change over time, such as information indicating the state of the disaster, can be provided to persons being in the building.

Further, by determining a start of the updating process based on the communication information, the updating process can be started at an appropriate timing in accordance with the communication state in the internal network. Thus, communication in the internal network can be stabled and information can be stably provided to persons being in the building.

(10) An information management method according to an embodiment of the present invention is to be performed in a local network system, the local network system including a network management device and a local information management device. The method includes: a step in which the network management device obtains communication information about a communication state in an internal network inside a building; a step in which the network management device transmits a data update starting request to the local information management device based on the obtained communication information; and a step in which the local information management device receives the data update starting request, obtains information from an external network outside the building, and starts an updating process for storing the obtained information as local information into a storage device which is accessible, not via the external network, by a terminal device connected to the internal network.

In this manner, by storing the information obtained from the external network as the local information in the storage device, even in a state where access to the external network is restricted, information stored in the storage device can be provided to persons being in the building. In addition, by the information stored in the storage device being updated, information that could change over time, such as information indicating the state of the disaster, can be provided to persons being in the building.

Further, by determining a start of the updating process based on the communication information, the updating process can be started at an appropriate timing in accordance with the communication state in the internal network. Thus, communication in the internal network can be stabled and information can be stably provided to persons being in the building.

(11) An information management program according to an embodiment of the present invention is to be used in an information management device. The program causes a computer to execute: a step of obtaining communication information about a communication state in an internal network inside a building; and a step of obtaining information from an external network outside the building, and determining, based on the obtained communication information, a start of an updating process for storing the obtained information as local information into a storage device which is accessible, not via the external network, by a terminal device connected to the internal network.

In this manner, by storing the information obtained from the external network as the local information in the storage device, even in a state where access to the external network is restricted, information stored in the storage device can be provided to persons being in the building. In addition, by the information stored in the storage device being updated, information that could change over time, such as information indicating the state of the disaster, can be provided to persons being in the building.

Further, by determining a start of the updating process based on the communication information, the updating process can be started at an appropriate timing in accordance with the communication state in the internal network. Thus, communication in the internal network can be stabled and information can be stably provided to persons being in the building.

(12) An information management program according to an embodiment of the present invention is to be used in a local network system, the local network system including a network management device and a local information management device. The program causes a computer to execute: a step in which the network management device obtains communication information about a communication state in an internal network inside a building; a step in which the network management device transmits a data update starting request to the local information management device based on the obtained communication information; and a step in which the local information management device receives the data update starting request, obtains information from an external network outside the building, and starts an updating process for storing the obtained information as local information into a storage device which is accessible, not via the external network, by a terminal device connected to the internal network.

In this manner, by storing the information obtained from the external network as the local information in the storage device, even in a state where access to the external network is restricted, information stored in the storage device can be provided to persons being in the building. In addition, by the information stored in the storage device being updated, information that could change over time, such as information indicating the state of the disaster, can be provided to persons being in the building.

Further, by determining a start of the updating process based on the communication information, the updating process can be started at an appropriate timing in accordance with the communication state in the internal network. Thus, communication in the internal network can be stabled and information can be stably provided to persons being in the building.

Hereinafter, embodiments of the present invention will be described with reference to the drawings. In the drawings, the same or corresponding parts are denoted by the same reference signs, and description thereof is not repeated. At least parts of the embodiments described below may be combined together as desired.

[Configuration and Basic Operation]

(Configuration of Local Network System)

FIG. 1 shows a configuration of a local network system according to an embodiment of the present invention.

With reference to FIG. 1, a local network system 301 is installed in a building 601 which is used as a shelter, for example. The local network system 301 includes a network management server (network management device or information management device) 101, a local information management server (local information management device) 103, a gateway 104, a storage device 105, and an internal network 401. The internal network 401 includes: a plurality of access points 151; and a hub, a router, and the like which are not shown.

The network management server 101, the local information management server 103, and the gateway 104 are connected to the internal network 401, and are communicable with one another.

The gateway 104 relays communication data between the internal network 401 and an external network 402. Each access point 151 is an access point for a wireless LAN system that complies with IEEE 802.11, and is communicable with each device connected to the internal network 401.

Wireless terminal devices 162 are each a portable information terminal such as a smartphone or a tablet. Each wireless terminal device 162 transmits/receives a wireless signal to/from an access point 151 that uses, for example, 2.4 GHz bandwidth which is an ISM band (Industry Science Medical band) in accordance with the IEEE 802.11 standard, thereby being able to communicate with the access point 151, another device connected to the internal network 401 via the access point 151, and another device connected to the external network 402 via the access point 151. The wireless terminal device 162 can select any one of the plurality of access points 151 to perform communication.

The wireless terminal device 162 employs the CSMA/CA (Carrier Sense Multiple Access with Collision Avoidance) scheme, for example, and determines whether another wireless terminal device 162 is transmitting a wireless signal. When having determined that the another wireless terminal device 162 is not transmitting a wireless signal, the wireless terminal device 162 transmits, to the access point 151, a wireless signal containing information to be transmitted.

The network management server 101 controls communication between the internal network 401 and the external network 402 performed by the wireless terminal device 162 or the like. Specifically, the network management server 101 has a function of proxy, DNS (Domain Name System), gateway, and the like, and manages all accesses to the external network 402 that occur in the internal network 401.

A wireless terminal device 162 connected to the internal network 401, that is, a wireless terminal device 162 having established communication connection with an access point 151 in the internal network 401, makes an inquiry about an IP address or the like to the network management server 101 or designates the network management server 101 as the destination for the IP packet or the like to be transmitted, in order to access the external network 402.

Accordingly, the network management server 101 becomes able to control the amount of communication that occurs in the internal network 401. Specifically, with regard to an access to the external network 402 requested by the wireless terminal device 162, the network management server 101 determines whether to permit the access, or not to permit the access and restrict the access to the storage device 105, for example.

The local information management server 103 obtains external data in a storage device 501 or the like connected to the external network 402, via the external network 402 or via a storage medium such as an USB (Universal Serial Bus) memory, and stores the obtained external data in the storage device 105. That is, as the method for updating the stored information in the storage device 105, there are a method of obtaining data via the external network 402, and a method of manually storing data that has been stored in a USB memory or the like and carried by a person.

The storage device 105 is connected to the internal network 401 via the local information management server 103, and has stored therein, as local information, information created inside the building 601 and information created outside the building 601.

Information created inside the building 601 being the shelter includes, for example: information to be shared in the shelter, such as the location of the equipment and a use rule; a request list from evacuees; and the name, address, and the like of each evacuee to be used as safety confirmation information. Information created outside the building 601 being the shelter includes, for example, news posted on newspapers and Web sites, and safety confirmation information in other shelters.

It should be noted that the local network system 301 may not be configured to include the network management server 101 as the information management device, and may be configured to include, as the information management device, a device in which the network management server 101 and the local information management server 103 are integrated. Further, the local network system 301 may be configured to include, as the information management device, a device in which the network management server 101 and the gateway 104 are integrated.

Further, the local network system 301 may be configured to include, as the information management device, a device in which the network management server 101, the local information management server 103, and the gateway 104 are integrated.

The local information management server 103 may be configured to include the storage device 105.

Moreover, the local information management server 103 and the storage device 105 may not be always installed in the building 601, and may be installed when the building 601 is used as a shelter after a disaster has occurred.

The access point 151 and the wireless terminal device 162 may be each a device that can perform wireless communication in accordance with another communication standard, such as ZigBee (registered mark), Bluetooth (registered mark), or the like, instead of IEEE 802.11.

Each terminal device that is used in the building 601 is not limited to the wireless terminal device 162, and may be a terminal device that performs wired communication as long as the terminal device is communicable with another device connected to the internal network 401 and is communicable with another device connected to the external network 402 via the internal network 401.

(Configuration of Network Management Server)

Figure 2:
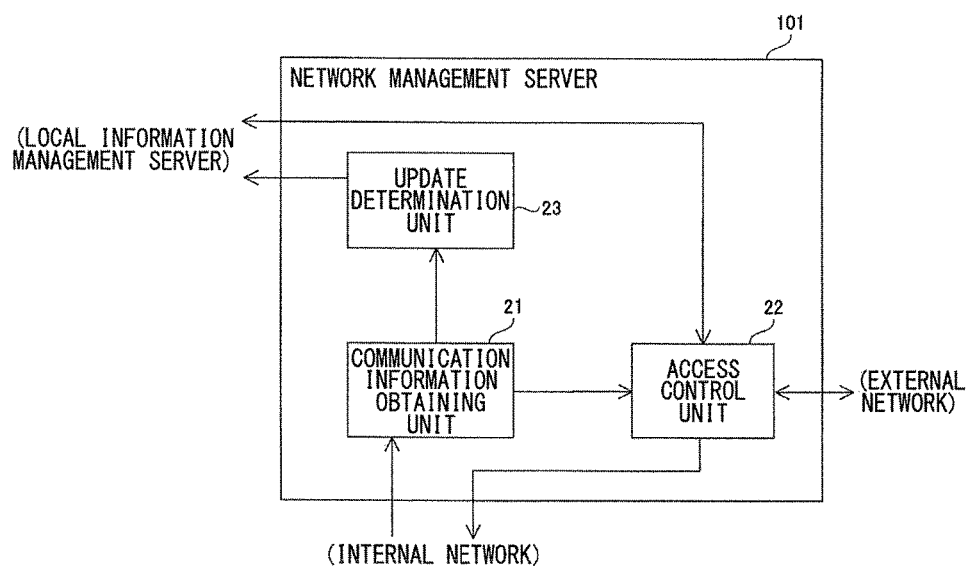
FIG. 2 shows a configuration of a network management server in the local network system according to the embodiment of the present invention.

FIG. 2 shows a configuration of the network management server in the local network system according to the embodiment of the present invention.

With reference to FIG. 2, the network management server 101 includes a communication information obtaining unit 21, an access control unit 22, and an update determination unit 23.

(a) Communication Information Obtaining Unit

The communication information obtaining unit 21 receives a connection request for connecting to the external network 402, via an access point 151 from a wireless terminal device 162 connected to the internal network 401. This connection request is an inquiry about an IP address or the like for accessing the external network 402, for example, and is included in an IP packet, for example. Then, the communication information obtaining unit 21 outputs the received connection request to the access control unit 22.

Based on the connection request or the like received from the wireless terminal device 162, the communication information obtaining unit 21 obtains communication information about the communication state in the local network system 301.

Specifically, the communication information obtaining unit 21 obtains, as the communication information, information about access to the external network 402 from wireless terminal devices 162 connected to the internal network 401, i.e., for example, the total number of accesses per unit time (hereinafter, also simply referred to as "the total number of accesses to the external network 402"). Then, the communication information obtaining unit 21 outputs the obtained communication information to the access control unit 22 and the update determination unit 23.

Without limitation to the total number of accesses to the external network 402 from the wireless terminal devices 162 connected to the internal network 401, the communication information obtaining unit 21 can obtain, as the communication information, various types of information about the communication state in the local network system 301. For example, the communication information obtaining unit 21 can obtain, as the communication information, the total number of accesses from the devices in the local network system 301 to the external network 402.

Moreover, for example, the communication information obtaining unit 21 can also obtain, as the communication information, the communication amount such as the volume of data transmitted to the internal network 401 from other devices such as servers connected to the external network 402 (hereinafter, also simply referred to as "the external network 402").

(b) Access Control Unit

The access control unit 22 controls the access to the external network 402 of the wireless terminal device 162 that has transmitted the connection request, based on the communication information obtained by the communication information obtaining unit 21. That is, the access control unit 22 determines whether to permit the access of the wireless terminal device 162 to the external network 402, or not to permit the access and restrict the access to the storage device 105, for example.

For example, when the total number of accesses to the external network 402 indicated by the communication information is less than a threshold, the access control unit 22 permits the access to the external network 402 of the wireless terminal device 162 that has transmitted the connection request. Then, the access control unit 22 transmits the connection request to the external network 402 via the gateway 104.

On the other hand, when the total number of accesses to the external network 402 indicated by the communication information is greater than or equal to the threshold, the access control unit 22 does not permit the access to the external network 402 of the wireless terminal device 162 that has transmitted the connection request, and restricts the access to the storage device 105, for example. Then, the access control unit 22 transmits the connection request to the local information management server 103.

In the case where communication connection between the wireless terminal device 162 and the external network 402 has been established, when data is transmitted from the external network 402 to the wireless terminal device 162, the access control unit 22 receives the data via the gateway 104. Then, the access control unit 22 transmits the received data to the wireless terminal device 162 via the access point 151.

It should be noted that the access control unit 22 may control the access to the external network 402 of the wireless terminal device 162, not only based on the communication information indicating the total number of accesses to the external network 402, but also based on other kinds of communication information.

For example, in the case where the communication information indicates the communication speed in the communication line of the external network 402, the access control unit 22 restricts, based on the communication speed, the number of wireless terminal devices 162 that access the external network 402.

For example, in the case where the communication information indicates an access destination designated by the wireless terminal device 162, the access control unit 22 estimates urgency or importance of the access by the wireless terminal device 162 based on the access destination, and performs a QoS (Quality of Service) process which allows in priority an access having high urgency or importance that has been estimated.

For example, the access control unit 22 confirms whether target information indicated by the communication information, i.e., target information to be accessed by the wireless terminal device 162, is stored in the storage device 105, and when the target information is stored therein, the access control unit 22 allows the wireless terminal device 162 to obtain the target information via the local information management server 103, by setting the local information management server 103 as the access destination for the wireless terminal device 162.

The access control unit 22 may control access, not based on the communication information, but in accordance with the type of the wireless terminal device 162 such that, for example, a wireless terminal device 162 of a type previously registered is connected to the external network 402 in preference to other wireless terminal devices 162.

For example, the access control unit 22 enhances the restriction of access from wireless terminal devices 162 to the external network 402 in the case where the current time is in a time zone during daytime, and loosens the restriction of the access in the case where the current time is in a time zone during nighttime.

The access control unit 22 also can control access from a wireless terminal device 162 to the external network 402, by comprehensively determining the number of accesses to the external network 402, the communication speed in the communication line of the external network 402, the access destination designated by the wireless terminal device 162, the presence/absence in the storage device 105 of target information to be accessed by the wireless terminal device 162, the type of the wireless terminal device 162, the current time, and the like.

(c) Update Determination Unit

The update determination unit 23 determines a start of a process of updating the local information with the data obtained via the external network 402, based on the communication information obtained by the communication information obtaining unit 21. For example, when the total number of accesses to the external network 402 indicated by the communication information obtained by the communication information obtaining unit 21 is less than a threshold, the update determination unit 23 determines to start the updating process of the local information, and transmits, to the local information management server 103, a data update starting request for giving an instruction to start the updating process.

When the total number of accesses to the external network 402 indicated by the communication information from the communication information obtaining unit 21 is greater than or equal to the threshold, and the updating process of the local information is being performed, the update determination unit 23 determines to end the updating process of the local information, and transmits, to the local information management server 103, a data update ending request for giving an instruction to end the updating process.

It should be noted that the update determination unit 23 also can determine a start of the updating process not only based on the communication information indicating the total number of accesses to the external network 402, but also based on other information such as current time, or the like.

(Configuration of Local Information Management Server)

Figure 3:
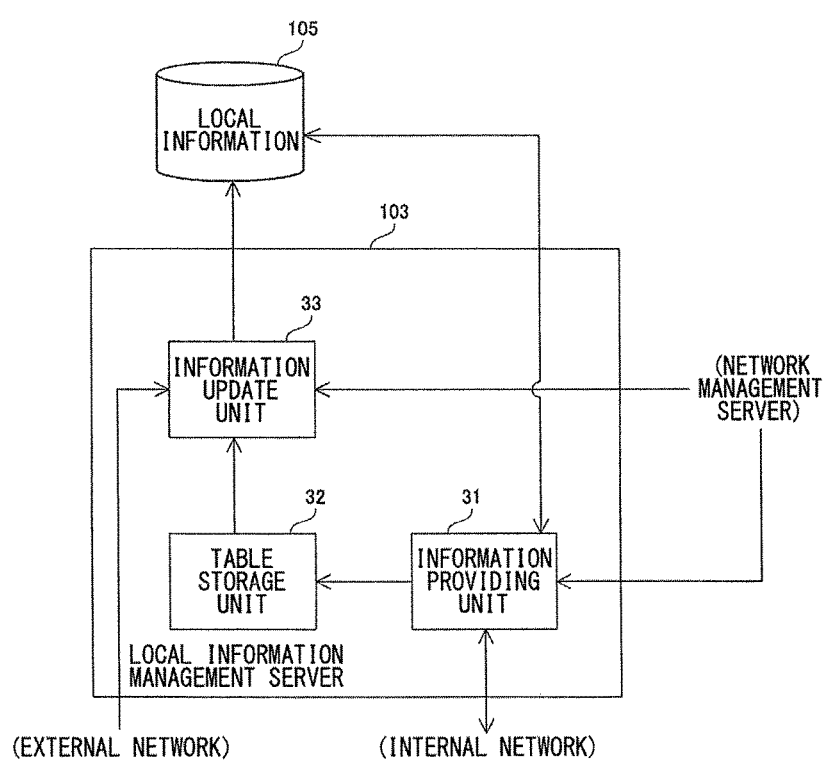
FIG. 3 shows a configuration of a local information management server in the local network system according to the embodiment of the present invention.

FIG. 3 shows a configuration of the local information management server in the local network system according to the embodiment of the present invention.

With reference to FIG. 3, the local information management server 103 includes an information providing unit 31, a table storage unit 32, and an information update unit 33.

The information providing unit 31 receives, for example, a word, i.e., a key word, searched by a person being in the building 601, from a wireless terminal device 162 that has established communication connection with the local information management server 103, via the access point 151 and the network management server 101. Then, the information providing unit 31 reads target information that includes the received key word, from the storage device 105 connected to the local information management server 103, and transmits the read target information to the wireless terminal device 162 via the access point 151.

The table storage unit 32 receives, from the information providing unit 31, a key word transmitted by each wireless terminal device 162 that has established communication connection with the local information management server 103, and stores the key word in the table. For example, the table includes, among a plurality of key words searched by persons being in the building 601, key words whose number of searches being greater than or equal to a predetermined number, and the key words included in the table are provided with priority in accordance with the descending order of the number of searches.

It should be noted that the table storage unit 32 may store a table previously generated by a manager or the like of the local network system 301.

Upon receiving a data update starting request from the network management server 101, the information update unit 33 receives external data from the external network 402, and starts the updating process of the local information stored in the storage device 105. At this time, the information update unit 33 refers to the table stored in the table storage unit 32, and performs the updating process such that information that includes a key word having a higher priority among the key words included in the table is stored as the local information in preference into the storage device 105. Then, upon completing storing all the key words included in the table into the storage device 105, the information update unit 33 ends the updating process.

It should be noted that, even before the information update unit 33 completes storing all the key words included in the table into the storage device 105, if the storage capacity of the storage device 105 has reached its upper limit value, or if a data update ending request has been received from the update determination unit 23 of the network management server 101, the information update unit 33 ends the updating process of the local information. Therefore, there are cases where, even when a key word is included in the table, information that includes the key word is not stored into the storage device 105.

[Operation]

Next, operation of the local network system 301 according to the embodiment of the present invention will be described.

Each device in the local network system 301 includes a computer, and a calculation processing unit such as a CPU in the computer reads and executes a program including a part or the entirety of steps of the following sequence diagram from a memory not shown. The programs for these plurality of devices can be each installed from outside. The programs for the plurality of devices are distributed, respectively stored in recording media.

(a) Access Control Process

Figure 4:
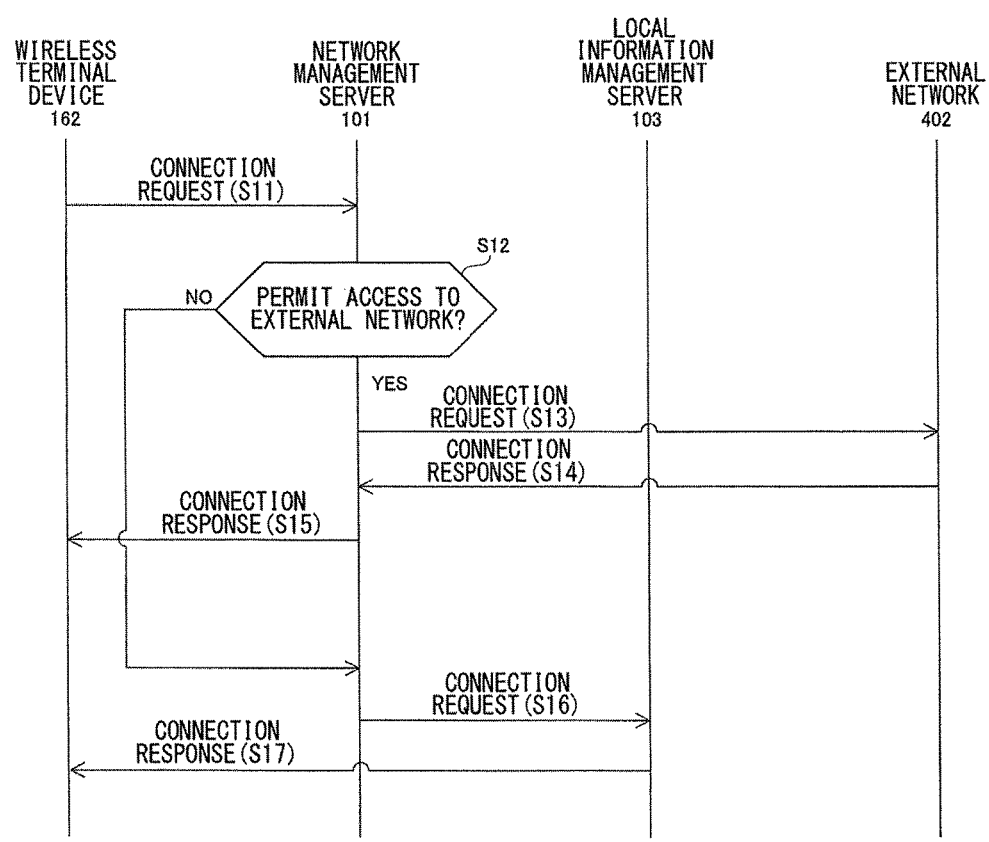
FIG. 4 is a sequence diagram showing an operation procedure performed when access from a wireless terminal device to an external network is controlled in the local network system according to the embodiment of the present invention.

FIG. 4 is a sequence diagram showing an operation procedure performed when access from a wireless terminal device to the external network is controlled in the local network system according to the embodiment of the present invention.

With reference to FIG. 4, when a wireless terminal device 162 transmits, to the network management server 101, a connection request for accessing the external network 402 (step S11), the network management server 101 determines whether to permit the access from the wireless terminal device 162 to the external network 402 (step S12).

For example, the network management server 101 obtains communication information about the communication state of the local network system 301 at the timing of receiving the connection request from the wireless terminal device 162. Then, for example, when the total number of accesses to the external network 402 indicated by the communication information is less than a threshold, the network management server 101 permits the access to the external network 402 from the wireless terminal device 162 being the transmission source of the connection request.

Upon permitting the access from the wireless terminal device 162 to the external network 402 ("YES" in step S12), the network management server 101 transmits, to the external network 402 via the gateway 104, the connection request transmitted from the wireless terminal device 162 (step S13).

Next, the external network 402 transmits, to the network management server 101 via the gateway 104, a connection response to the connection request received from the network management server 101 (step S14).

Then, the network management server 101 transmits, to the wireless terminal device 162 via the access point 151, the connection response received from the external network 402 (step S15).

In this manner, in the state where the communication connection between the wireless terminal device 162 and the external network 402 is established, when a person being in the building 601 designates a key word or the like by use of the wireless terminal device 162, the wireless terminal device 162 receives target information that includes the key word from the storage device 501 connected to the external network 402, via the external network 402, the gateway 104, the network management device 101, and the access point 151.

On the other hand, when the network management server 101 does not permit the access from the wireless terminal device 162 to the external network 402 because, for example, the total number of accesses to the external network 402 indicated by the communication information is greater than or equal to the threshold ("NO" in step S12), the network management server 101 transmits, to the local information management server 103, the connection request transmitted from the wireless terminal device 162 (step S16).

Next, the local information management server 103 transmits, to the wireless terminal device 162, a connection response to the connection request received from the network management server 101 (step S17). In this manner, in the state where the communication connection between the wireless terminal device 162 and the local information management server 103 is established, when a person being in the building 601 designates a key word or the like by use of the wireless terminal device 162, the wireless terminal device 162 receives target information that includes the key word from the storage device 105 connected to the local information management server 103, via the local information management server 103 and the access point 151.

When the target information that includes the key word designated by the wireless terminal device 162 is not stored in the storage device 105, the local information management server 103 transmits an error notification to the wireless terminal device 162, for example.

(b-1) Process of Determining a Start of the Updating Process

Figure 5:
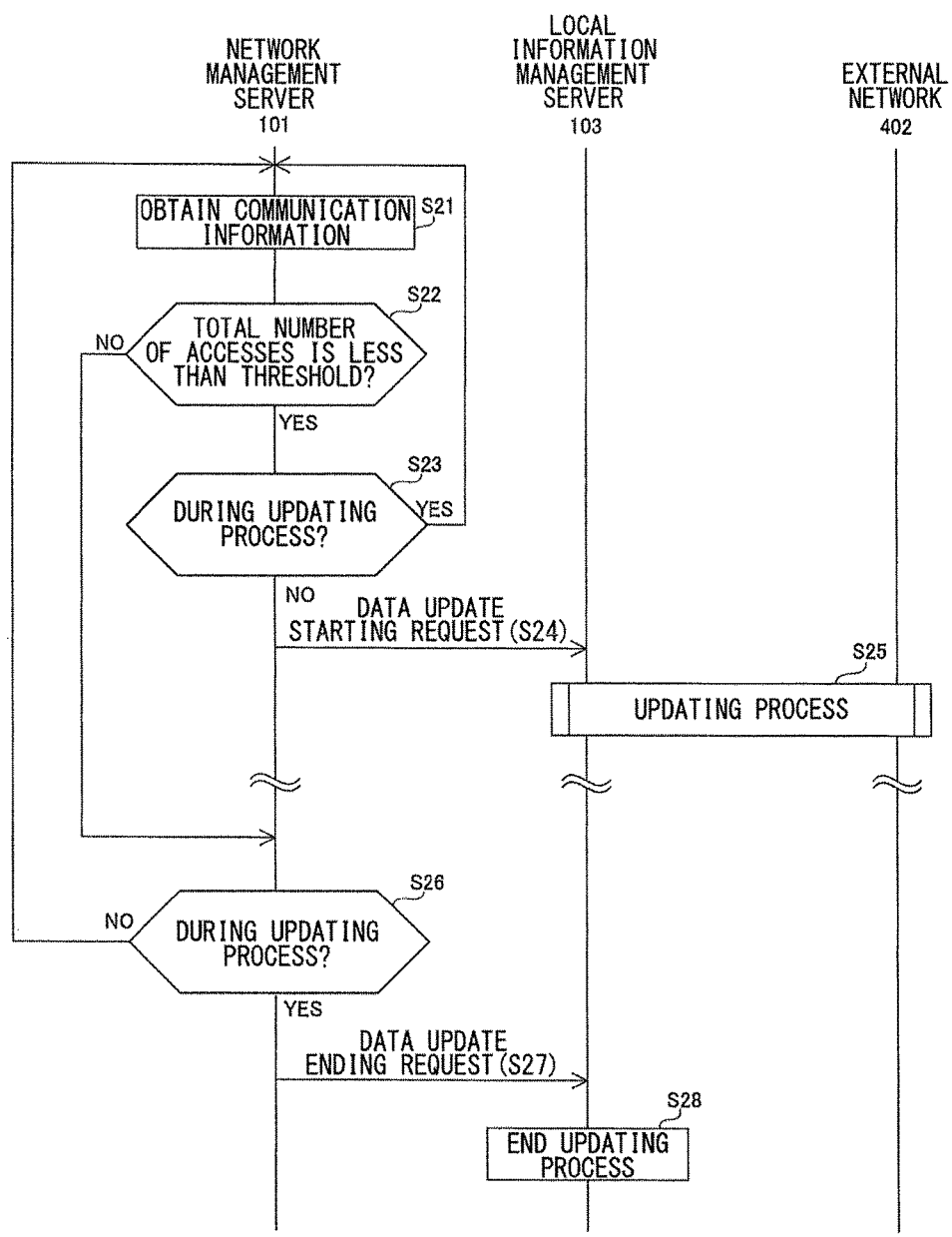
FIG. 5 is a sequence diagram showing an operation procedure performed when a start of an updating process of local information is determined in the local network system according to the embodiment of the present invention.

FIG. 5 is a sequence diagram showing an operation procedure performed when a start of the updating process of the local information is determined in the local network system according to the embodiment of the present invention.

With reference to FIG. 5, first, the network management server 101 obtains communication information about the communication state in the internal network 401 (step S21).

Next, the network management server 101 confirms whether the total number of accesses to the external network 402 indicated by the obtained communication information is less than a threshold, for example (step S22). Then, when the total number of accesses to the external network 402 is less than the threshold ("YES" in step S22), the network management server 101 confirms whether the updating process of the local information is being performed (step S23).

When the updating process of the local information is not being performed ("NO" in step S23), the network management server 101 determines to start the updating process, and transmits a data update starting request to the local information management server 103 (step S24).

Next, upon receiving the data update starting request from the network management server 101, the local information management server 103 receives data from the external network 402 via the gateway 104, and performs the updating process for storing the received data into the storage device 105 (step S25).

On the other hand, when the total number of accesses to the external network 402 is less than the threshold ("YES" in step S22) and the updating process of the local information is being performed ("YES" in step S23), the network management server 101 waits until obtaining the next communication information (step S21).

When the total number of accesses to the external network 402 is greater than or equal to the threshold ("NO" in step S22), the network management server 101 confirms whether the updating process of the local information is being performed (step S26).

When the updating process of the local information is being performed ("YES" in step S26), the network management server 101 determines to end the updating process, and transmits a data update ending request to the local information management server 103 (step S27).

Next, upon receiving the data update ending request from the network management server 101, the local information management server 103 ends the updating process of the local information (step S28).

On the other hand, when the updating process of the local information is not being performed ("NO" in step S26), the network management server 101 waits until obtaining the next communication information (step S21).

Irrespective of whether the updating process of the local information is being performed, when the network management server 101 obtains new communication information (step S21), the network management server 101 determines a start of, continue, or end the updating process performed by the local information management server 103 (step S23 and step S26).

Figure 6:
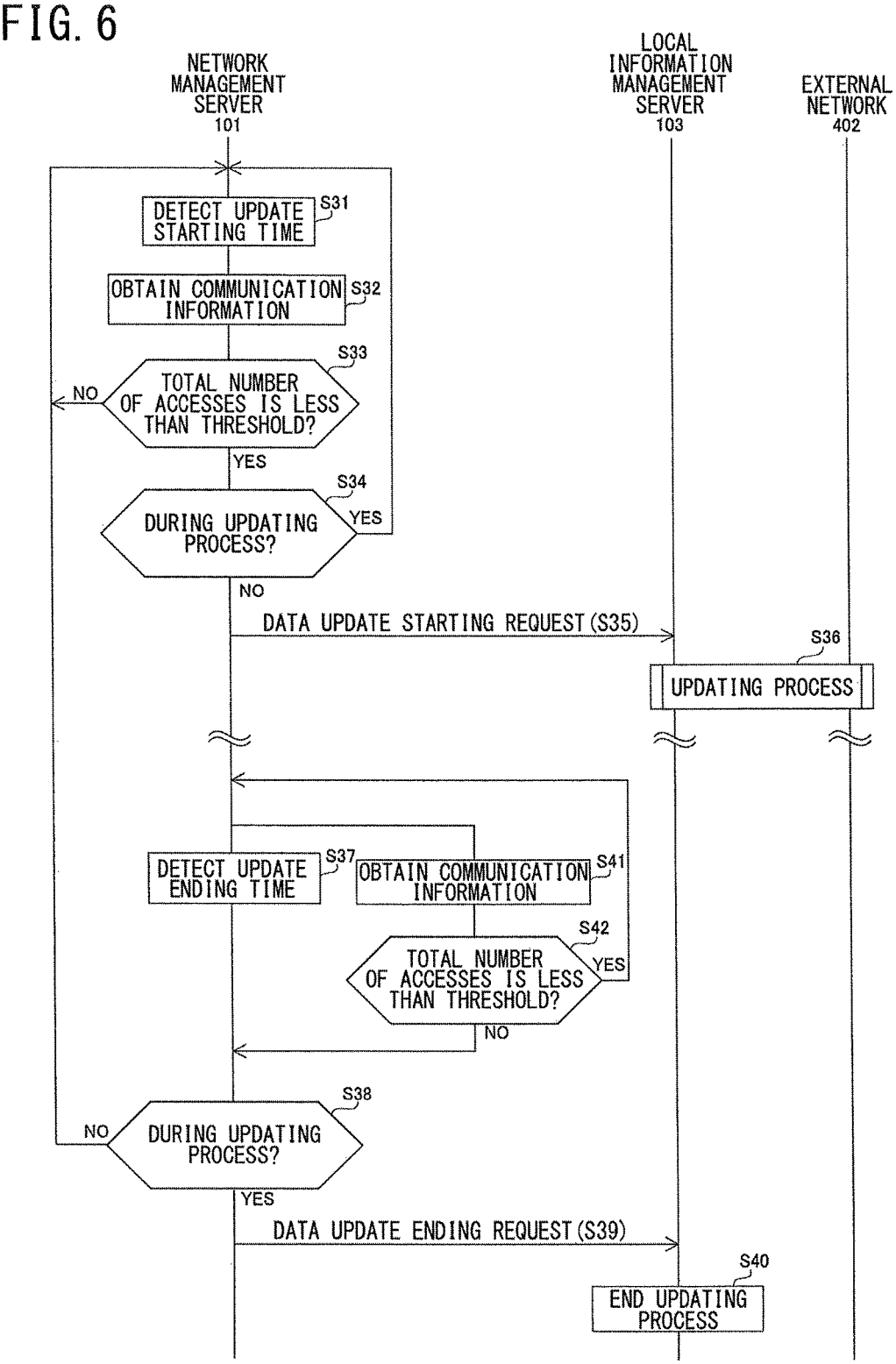
FIG. 6 is a sequence diagram showing an operation procedure (Modification 1) performed when a start of the updating process of local information is determined in the local network system according to the embodiment of the present invention.

(b-2) Modification 1 of the Process of Determining a Start of the Updating Process FIG. 6 is a sequence diagram showing an operation procedure (Modification 1) performed when a start of the updating process of the local information is determined in the local network system according to the embodiment of the present invention.

The network management server 101 may determine a start of the updating process of the local information, by use of current time and communication information.

Specifically, with reference to FIG. 6, first, the network management server 101 confirms a timer thereof, for example, and detects an update starting time being the time at which to start the updating process of the local information (step S31). This update starting time is, for example, a time included in a time zone when activities by persons in the building 601 being the shelter are reduced, i.e., the time zone when the number of wireless terminal devices 162 that perform communication in the internal network 401 is continuously reduced. The update starting time is previously set by a manager or the like.

Upon detecting the update starting time, the network management server 101 obtains communication information (step S32).

Next, the network management server 101 confirms whether the total number of accesses to the external network 402 indicated by the obtained communication information is less than a threshold, for example (step S33). When the total number of accesses to the external network 402 is less than the threshold ("YES" in step S33), the network management server 101 confirms whether the updating process of the local information is being performed (step S34).

When the updating process of the local information is not being performed ("NO" in step S34), the network management server 101 determines to start the updating process, and transmits a data update starting request to the local information management server 103 (step S35).

Next, upon receiving the data update starting request from the network management server 101, the local information management server 103 receives data from the external network 402 via the gateway 104, and performs the updating process for storing the received data into the storage device 105 (step S36).

On the other hand, when the total number of accesses to the external network 402 is less than the threshold ("YES" in step S33) and the updating process of the local information is being performed ("YES" in step S34"), the network management server 101 does not transmit the data update starting request and waits until the next update starting time (step S31).

When the total number of accesses to the external network 402 is greater than or equal to the threshold ("NO" in step S33), the network management server 101 does not transmit the data update starting request and waits until the next update starting time (step S31).

Next, the network management server 101 confirms the timer, for example, and detects an update ending time being a time at which to end the updating process of the local information (step S37). This update ending time is, for example, a time included in a time zone when activities by persons in the building 601 being the shelter are increased, i.e., a time zone when the number of wireless terminal devices 162 that perform communication in the internal network 401 is increased. The update ending time is previously set by a manager or the like.

Upon detecting the update ending time, the network management server 101 confirms whether the updating process of the local information is being performed (step S38).

When the updating process of the local information is being performed ("YES" in step S38), the network management server 101 determines to end the updating process, and transmits a data update ending request to the local information management server 103 (step S39).

Next, upon receiving the data update ending request from the network management server 101, the local information management server 103 ends the updating process of the local information (step S40).

On the other hand, when the updating process of the local information is not being performed ("NO" in step S38), the network management server 101 does not transmit the data update ending request and waits until the next update starting time (step S31).

In parallel with monitoring the timer for detecting the update ending time, the network management server 101 obtains communication information (step S41).

Then, the network management server 101 confirms whether the total number of accesses to the external network 402 indicated by the obtained communication information is less than a threshold, for example (step S42). When the total number of accesses to the external network 402 is not less than the threshold, ("NO" in step S42), the network management server 101 confirms whether the updating process of the local information is being performed (step S38).

When the updating process of the local information is being performed ("YES" in step S38), the network management server 101 determines to end the updating process, and transmits a data update ending request to the local information management server 103 (step S39).

Next, upon receiving the data update ending request from the network management server 101, the local information management server 103 ends the updating process of the local information (step S40).

On the other hand, when the total number of accesses to the external network 402 is less than the threshold ("YES" in step S42), the network management server 101 continues monitoring the timer for detecting the update ending time and obtaining communication information (step S37 and step S41).

(b-3) Modification 2 of the Process of Determining a Start of the Updating Process FIG. 7 is a sequence diagram showing an operation procedure (Modification 2) performed when a start of the updating process of the local information is determined in the local network system according to the embodiment of the present invention.

The network management server 101 may determine a start of the updating process of the local information, by use of only the current time.

Specifically, with reference to FIG. 7, first, the network management server 101 confirms the timer, for example, and detects the update starting time (step S51). Upon detecting the update starting time, the network management server 101 transmits a data update starting request to the local information management server 103 (step S52).

Upon receiving the data update starting request from the network management server 101, the local information management server 103 starts the updating process of the local information (step S53).

Next, the network management server 101 confirms the timer, for example, and detects the update ending time (step S54). Upon detecting the update ending time, the network management server 101 transmits a data update ending request to the local information management server 103 (step S55). Upon receiving the data update ending request from the network management server 101, the local information management server 103 ends the updating process of the local information (step S56).

(c-1) Updating Process

Figures 9, 10:
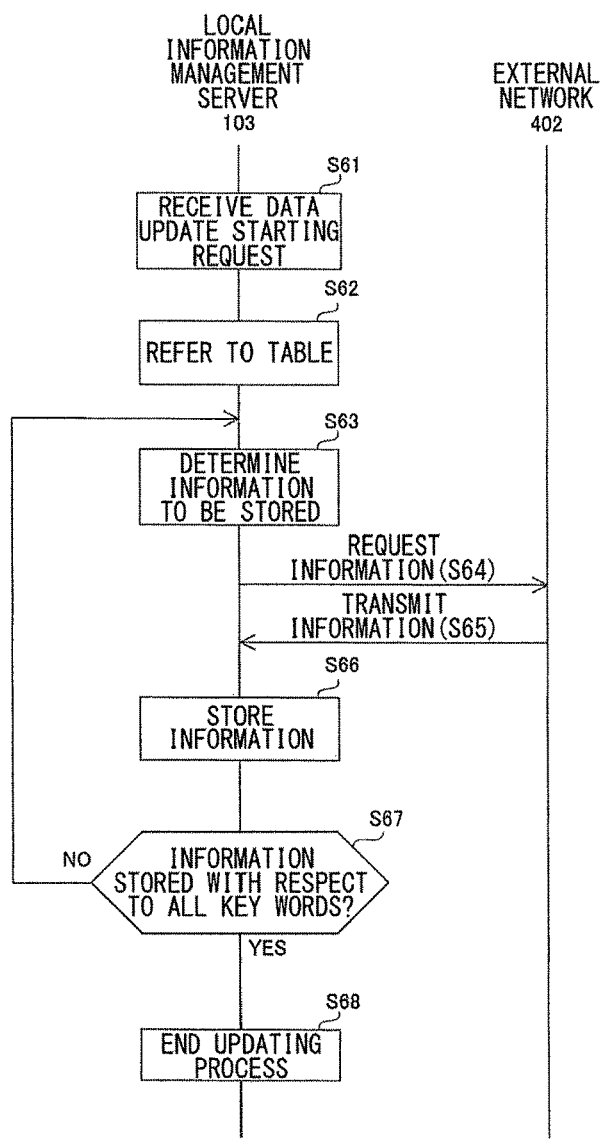
FIG. 9 is a sequence diagram showing one example of an operation procedure of the updating process performed by the local information management server.
FIG. 10 shows one example of a table stored in the table storage unit of the local information management server in the local network system according to the embodiment of the present invention.

FIG. 8 shows one example of a table stored in the table storage unit of the local information management server in the local network system according to the embodiment of the present invention. FIG. 9 is a sequence diagram showing one example of an operation procedure of the updating process performed by the local information management server.

With reference to FIG. 8, a table T1 stored in the table storage unit 32 includes, for example, "earthquake disaster", "restoration", "safety", . . . as the key word. In the descending order of the number of searches, "earthquake disaster" is assigned with priority "1", "restoration" is assigned with priority "2", and "safety" is assigned with priority "3".

In such a case, as shown in FIG. 9, first, when the local information management server 103 has received a data update starting request (step S61), the local information management server 103 refers to the table T1 stored in the table storage unit 32 thereof (step S62).

Then, the local information management server 103 extracts, from among key words included in the table T1, "earthquake disaster" which is the key word having the highest priority, and determines information that includes the extracted "earthquake disaster", as information to be stored as the local information (step S63).

Next, the local information management server 103 requests information that includes "earthquake disaster" from the external network 402 (step S64). Then, the external network 402 extracts information that includes the key word "earthquake disaster" from external data stored in the storage device 501, and transmits the extracted information to the local information management server 103 (step S65). Then, the local information management server 103 stores the information that includes the key word "earthquake disaster" received from the external network 402, as the local information into the storage device 105 (step S66).

Next, the local information management server 103 confirms whether information has been stored with respect to all the key words included in the table T1 (step S67).

When information has not been stored with respect to the key words "restoration" and "safety", for example ("NO" in step S67), the local information management server 103 extracts the key word having the highest priority, i.e., "restoration", from among the key words with respect to which information has not been stored. Then, the local information management server 103 determines information that includes the extracted "restoration", as information to be stored as the local information (step S63), and requests information that includes "restoration" from the external network 402 (step S64).

Then, the external network 402 extracts information that includes the key word "restoration" from external data stored in the storage device 501, and transmits the extracted information to the local information management server 103 (step S65). Then, the local information management server 103 stores the information that includes the key word "restoration" received from the external network 402, as the local information into the storage device 105 (step S66).

Having stored the information that includes the key word "restoration" into the storage device 105 as described above, also with respect to information that includes the key word "safety", the local information management server 103 requests the information from the external network 402 and stores the information received from the external network 402 into the storage device 105, in a similar manner.

Then, having stored information with respect to all the key words included in the table T1 in this manner ("YES" in step S67), the local information management server 103 ends the updating process of the local information (step S68).

(c-2) Modification 1 of the Updating Process

FIG. 10 shows one example of a table stored in the table storage unit of the local information management server in the local network system according to the embodiment of the present invention.

Instead of the key word searched by a person being in the building 601 by use of the wireless terminal device 162, the table stored in the table storage unit 32 may include the URL of the site being the access destination of the wireless terminal device 162, for example.

Specifically, as shown in FIG. 10, a table T2 stored in the table storage unit 32 includes, for example, the URL of "site A", the URL of "site B", the URL of "site C", . . . . In the descending order of the number of accesses, the URL of "site A" is assigned with priority "1", the URL of "site B" is assigned with priority "2", and the URL of "site C" is assigned with priority "3".

In such a case, the local information management server 103 performs the updating process such that the information of a site having a higher priority is stored, in preference in order, as the local information into the storage device 105.

More specifically, first, the local information management server 103 receives information of "site A" from the external network 402 and stores the received information as the local information into the storage device 105. Next, the local information management server 103 receives information of "site B" from the external network 402 and stores the received information as the local information into the storage device 105. Then, the local information management server 103 receives information of "site C" from the external network 402 and stores the received information as the local information into the storage device 105.

(c-3) Modification 2 of the Updating Process

Figure 11:
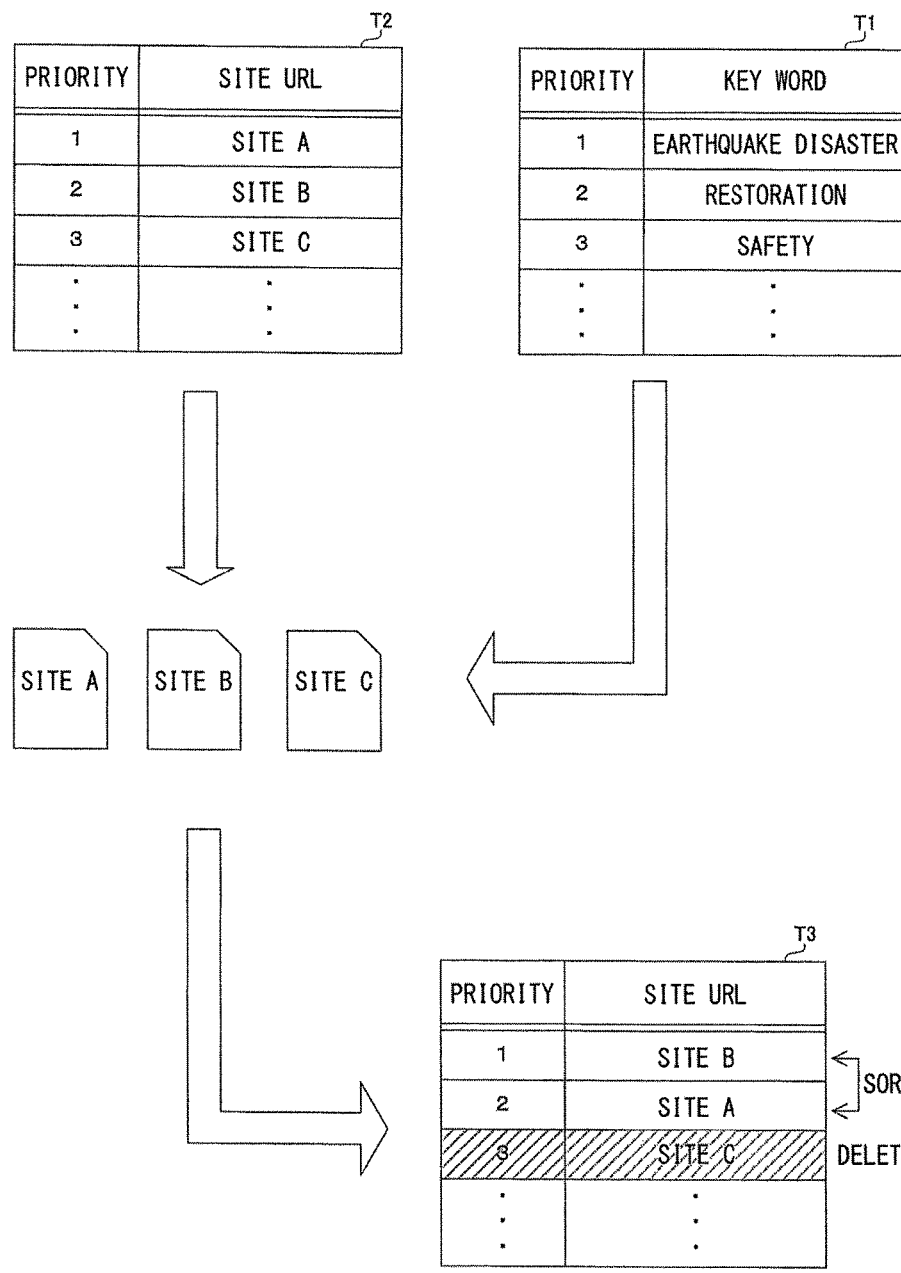
FIG. 11 shows one example of a table stored in the table storage unit of the local information management server in the local network system according to the embodiment of the present invention.
Figure 12:
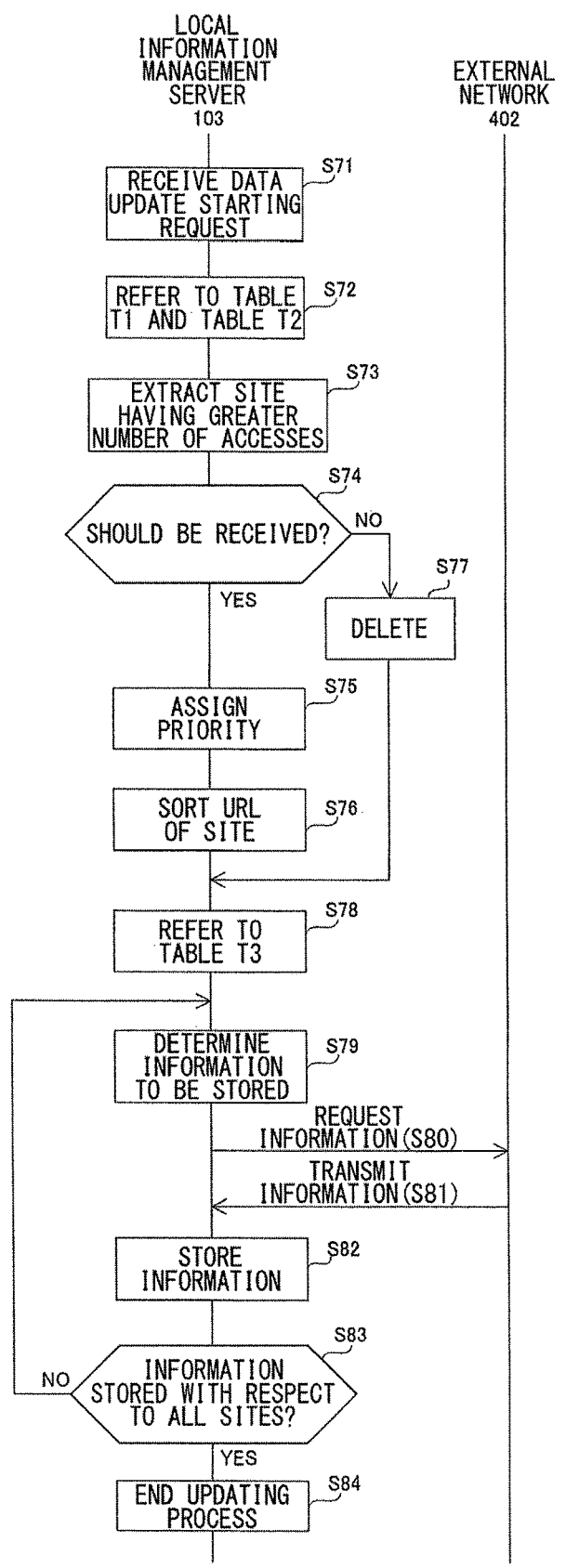
FIG. 12 is a sequence diagram showing one example of an operation procedure of the updating process performed by the local information management server.

FIG. 11 shows one example of a table stored in the table storage unit of the local information management server in the local network system according to the embodiment of the present invention. FIG. 12 is a sequence diagram showing one example of an operation procedure of the updating process performed by the local information management server.

The table stored in the table storage unit 32 may include both of key words searched by a person being in the building 601 by use of a wireless terminal device 162, and the URL of each site being the access destination of the wireless terminal device 162.

Specifically, with reference to FIG. 11, the table storage unit 32 has stored therein the table T1 and the table T2, for example. The table T1 includes the key word "earthquake disaster", "restoration", "safety", . . . . In the descending order of the number of searches, "earthquake disaster" is assigned with priority "1", "restoration" is assigned with priority "2", and "safety" is assigned with priority "3". The table T2 includes the URL of "site A", the URL of "site B", the URL of "site C", . . . . In the descending order of the number of accesses, the URL of "site A" is assigned with priority "1", the URL of "site B" is assigned with priority "2", and the URL of "site C" is assigned with priority "3".

In such a case, as shown in FIG. 12, first, when the local information management server 103 has received a data update starting request (step S71), the local information management server 103 refers to the table T1 and the table T2 stored in the table storage unit 32 thereof (step S72).

Then, the local information management server 103 extracts, from among the URLs of sites stored in the table T2, the URLs of sites having greater number of accesses, specifically, the URL of "site A", the URL of "site B", and the URL of "site C" (step S73).

Next, the local information management server 103 determines, by use of the key words stored in the table T1, whether the information of each extracted site should be received in the updating process of the local information.

For example, it is assumed that the information of "site A" and the information of "site B" include any one of the key words "earthquake disaster", "restoration", "safety", . . . which are included in the table T1. In this case, the local information management server 103 determines that the information of "site A" and the information of "site B" should be received.

Meanwhile, it is assumed that the information of "site C" does not include any one of the key words "earthquake disaster", "restoration", "safety", . . . which are included in the table T1. In this case, the local information management server 103 determines that the information of "site C" should not be received (step S74).

Next, based on the information of the sites which has been determined as should be received, specifically, based on the key word included in each of the information of "site A" and the information of "site B", the local information management server 103 assigns priorities to the URLs of these sites.

Here, it is assumed that the information of "site A" includes "restoration" which is the key word assigned with priority "2" in the table T1, and the information of "site B" includes "earthquake disaster" which is the key word assigned with priority "1" in the table T1. In this case, the local information management server 103 assigns priority "1" to the URL of "site B" and assigns priority "2" to the URL of "site A" (step S75).

Next, the local information management server 103 sorts the URLs of the plurality of sites included in the table T2, based on the newly assigned priorities. That is, the local information management server 103 switches the order of the URL of "site A" and the URL of "site B" (step S76). In addition, the local information management server 103 deletes, from the table T2, the URL of the site which has been determined as should not be received, specifically, the URL of "site C" (step S77).

Then, the table in which the URLs of the sites included in the table T2 have been sorted and from which the URLs of the sites whose information should not be received have been deleted is defined as a table T3.

Next, the local information management server 103 refers to the table T3 (step S78), and determines information that should be stored in accordance with the newly assigned priorities. That is, the local information management server 103 stores the information of "site B" and the information of "site A" in preference in this order, into the storage device 105.

The operation from step S79 to step S84 are the same as the operation from step S63 to step S68 shown in FIG. 9, and thus, detailed description thereof is not repeated here.

It should be noted that the local information management server 103 may perform the operation from step S71 to step S77, before receiving the data update starting request.

The local information management server 103 may determine the information to be stored in preference into the storage device 105, based on, for example, the type of external data stored in the storage device 501, specifically, whether the external data is a moving picture or text data, instead of the number of searches of key words or the number of accesses to sites.

Meanwhile, on the occurrence of a disaster, in many cases, persons outside the disaster area need safety information, whereas persons within the disaster area also need various types of information such as transportation infrastructure. However, when many people are crowded in a limited space such as a shelter, and these many people respectively try to access an external network by use of their terminal devices and the like, there is a possibility that congestion occurs in an internal network provided inside the building such as a shelter, access to the external network is restricted, and information cannot be obtained. In addition, communication equipment may be damaged due to the disaster, and this may result in further difficulty in stable provision of information to persons being in the building such as a shelter.

In contrast to this, in the local network system 301 according to the embodiment of the present invention, the communication information obtaining unit 21 of the network management server 101 obtains communication information about the communication state in the internal network 401 inside the building 601. The information update unit 33 of the local information management server 103 obtains information from the external network 402 outside the building 601, and performs the updating process for storing the obtained information as the local information into the storage device 105 which is accessible, not via the external network 402, by a wireless terminal device 162 connected to the internal network 401. The update determination unit 23 determines a start of the updating process by the information update unit 33, based on the communication information obtained by the communication information obtaining unit 21.

In this manner, with the configuration in which the information obtained from the external network 402 is stored as the local information in the storage device 105, even in a state where the access to the external network 402 is restricted, information stored in the storage device 105 can be provided to persons being in the building. In addition, with the configuration in which information stored in the storage device 105 is updated, information that could change over time, such as information indicating the state of the disaster, can be provided to persons being in the building.

Further, with the configuration in which a start of the updating process is determined based on the communication information, the updating process can be started at an appropriate timing in accordance with the communication state in the internal network 401. Thus, communication in the internal network 401 can be stabled and information can be stably provided to persons being in the building 601.

In the local network system 301 according to the embodiment of the present invention, the communication information obtaining unit 21 obtains communication information about access to the external network 402 from the internal network 401.

In this configuration, for example, the access to the external network 402 from a wireless terminal device 162 connected to the internal network 401 is allowed in preference, and the updating process is performed while the communication amount of such accesses is small, whereby accesses to the external network 402 from persons being in the building 601 can be prevented from being restricted due to the updating process.

In the local network system 301 according to the embodiment of the present invention, the update determination unit 23 determines a start of the updating process based on the current time and the communication information.

Thus, with the configuration in which a start of the updating process is determined by use of the current time in addition to the communication information, it is possible to prevent the updating process from being started in a state where the communication amount is only temporarily reduced, and it is possible to perform the updating process in a time zone where the communication amount is continuously small such as during nighttime.

In the local network system 301 according to the embodiment of the present invention, the information update unit 33 stores, as the local information, information that includes a predetermined word, in preference into the storage device 105.

With this configuration, information in greater need can be stored in preference into the storage device 105. Moreover, various types of information that includes words of higher relevance can be collectively received from the external network 402, to be stored in the storage device 105.

In the local network system 301 according to the embodiment of the present invention, the information update unit 33 can store, as the local information, information having a large number of accesses from wireless terminal devices 162, in preference into the storage device 105.

With this configuration, information actually obtained by persons in the building 601 can be stored in preference into the storage device 105, as information in greater need.

In the local network system 301 according to the embodiment of the present invention, the access control unit 22 of the network management server 101 determines whether to permit access from a wireless terminal device 162 to the external network 402.

With this configuration, optimum control of the updating process and the communication amount in the internal network 401 can be realized.

In the local network system 301 according to the embodiment of the present invention, when the access control unit 22 does not permit access from a wireless terminal device 162 to the external network 402, and target information to be accessed by the wireless terminal device 162 is stored in the storage device 105, the access control unit 22 can perform a process of allowing the terminal device to obtain the target information in the storage device 105.

With this configuration, even a wireless terminal device 162 whose access to the external network 402 has not been permitted because of the updating process being performed, for example, can obtain the target information which is to be accessed.

The above embodiment is merely illustrative in all aspects and should not be recognized as being restrictive. The scope of the present invention is defined not by the above description but by the scope of the claims, and is intended to include meaning equivalent to the scope of the claims and all modifications within the scope.

The above description includes the features of the additional notes below.

[Additional Note 1]

An information management device including:

a communication information obtaining unit configured to obtain communication information about a communication state in an internal network inside a building; and an update determination unit configured to obtain information from an external network outside the building, and configured to determine, based on the communication information obtained by the communication information obtaining unit, a start of an updating process which is to be performed by an information update unit, the updating process being a process for storing the obtained information as local information into a storage device which is accessible, not via the external network, by a terminal device connected to the internal network, wherein
the building is a shelter that is used during a disaster, and the local information includes at least one of Web site, news, and safety confirmation information in another building.

[Additional Note 2]

A local network system including:
a network management device configured to obtain communication information about a communication state in an internal network inside a building; and
a local information management device configured to obtain information from an external network outside the building, and configured to perform an updating process for storing the obtained information as local information into a storage device which is accessible, not via the external network, by a terminal device connected to the internal network, wherein
based on the obtained communication information, the network management device transmits, to the local information management device, a data update starting request for giving an instruction to start the updating process,
the local information management device receives the data update starting request and starts the updating process,
the building is a shelter that is used during a disaster, and
the local information includes at least one of Web site, news, and safety confirmation information in another building.

REFERENCE SIGNS LIST 21 communication information obtaining unit
22 access control unit
23 update determination unit
31 information providing unit
32 table storage unit
33 information update unit
101 network management server (network management device or information management device)
103 local information management server (local information management device)
104 gateway
105 storage device
151 access point
162 wireless terminal device
301 local network system
401 internal network
402 external network
501 storage device
601 building

The invention claimed is:

1. An information management device comprising:
non-transitory computer readable memory;
a hardware processor coupled to the non-transitory computer readable memory and configured to read instructions from the non-transitory computer readable memory to cause the information management device to perform operations comprising:
obtaining communication information about a communication state in an internal network inside a building;
determining whether or not to start an updating process based on the obtained communication information, the updating process being for storing information obtained from an external network outside the building as local information into a storage device included in the internal network; and
determining whether or not to permit access from a terminal device to the external network, wherein
when the access from the terminal device to the external network is not permitted and target information to be accessed by the terminal device is stored in the storage device, the information management device performs a secondary process of allowing the terminal device to obtain the target information in the storage device,
the internal network includes:
a first table storing site information indicating a site included in the external network;
a second table storing a word searched on the external network by the terminal device; and
a third table storing a site being a reception target from which information to be stored as the local information is received, in accordance with priority representing urgency and/or importance, and
the updating process includes:
determining whether or not the site indicated by the site information stored in the first table is the reception target, based on whether or not information obtained from the site includes the word stored in the second table;
providing priority to the site determined to be the reception target and creating the third table including the site determined to be the reception target and not including the site determined not to be the reception target; and
receiving, from the site being the reception target, information that includes the word stored in the second table and storing the received information as the local information into the storage device.

2. The information management device according to claim 1, wherein
the obtaining operation comprises obtaining communication information about access to the external network from the internal network.

3. The information management device according to claim 1, wherein
the determining operation comprises determining a start of the updating process, based on a current time and the communication information.

4. The information management device according to claim 1, wherein
the operations further comprise
storing, as the local information, information having a large number of accesses from the terminal device, in preference into the storage device.

5. A local network system comprising:
a network management device to obtain communication information about a communication state in an internal network inside a building; and
a local information management device to perform an updating process for storing information obtained from an external network outside the building as local information into a storage device included in the internal network, wherein
based on the obtained communication information, the network management device transmits, to the local information management device, a data update starting request for giving an instruction to start the updating process,
the local information management device receives the data update starting request and starts the updating process, the network management device determines whether or not to permit access from a terminal device to the external network, when the access from the terminal device to the external network is not permitted and target information to be accessed by the terminal device is stored in the storage device, the network management device performs a secondary process of allowing the terminal device to obtain the target information in the storage device, the internal network includes:

a first table storing site information indicating a site included in the external network;

a second table storing a word searched on the external network by the terminal device; and a third table storing a site being a reception target from which information to be stored as the local information is received, in accordance with priority representing urgency and/or importance, and the updating process includes:

determining whether or not the site indicated by the site information stored in the first table is the reception target, based on whether or not information obtained from the site includes the word stored in the second table;

providing priority to the site determined to be the reception target and creating the third table including the site determined to be the reception target and not including the site determined not to be the reception target; and receiving, from the site being the reception target, information that includes the word stored in the second table and storing the received information as the local information into the storage device.

6. An information management method to be performed in an information management device, the method comprising:

obtaining communication information about a communication state in an internal network inside a building;

determining whether or not to start an updating process based on the obtained communication information, the updating process being for storing information obtained from an external network outside the building as local information into a storage device included in the internal network; and determining whether or not to permit access from a terminal device to the external network, wherein when the access from the terminal device to the external network is not permitted and target information to be accessed by the terminal device is stored in the storage device, the information management device performs a secondary process of allowing the terminal device to obtain the target information in the storage device, the internal network includes:

a first table storing site information indicating a site included in the external network;

a second table storing a word searched on the external network by the terminal device; and a third table storing a site being a reception target from which information to be stored as the local information is received, in accordance with priority representing urgency and/or importance, and the updating process includes:

determining whether or not the site indicated by the site information stored in the first table is the reception target, based on whether or not information obtained from the site includes the word stored in the second table;

providing priority to the site determined to be the reception target and creating the third table including the site determined to be the reception target and not including the site determined not to be the reception target; and receiving, from the site being the reception target, information that includes the word stored in the second table and storing the received information as the local information into the storage device.

7. An information management method to be performed in a local network system, the local network system including a network management device and a local information management device, the method comprising:

the network management device obtaining communication information about a communication state in an internal network inside a building;

the network management device transmitting a data update starting request to the local information management device based on the obtained communication information;

the local information management device receiving the data update starting request and starting an updating process for storing information obtained from an external network outside the building as local information into a storage device included in the internal network; and the network management device determining whether or not to permit access from a terminal device to the external network, wherein when the access from the terminal device to the external network is not permitted and target information to be accessed by the terminal device is stored in the storage device, the network management device performs a secondary process of allowing the terminal device to obtain the target information in the storage device, the internal network includes:

a first table storing site information indicating a site included in the external network;

a second table storing a word searched on the external network by the terminal device; and a third table storing a site being a reception target from which information to be stored as the local information is received, in accordance with priority representing urgency and/or importance, and the updating process includes:

determining whether or not the site indicated by the site information stored in the first table is the reception target, based on whether or not information obtained from the site includes the word stored in the second table;

providing priority to the site determined to be the reception target and creating the third table including the site determined to be the reception target and not including the site determined not to be the reception target; and receiving, from the site being the reception target, information that includes the word stored in the second table and storing the received information as the local information into the storage device.

8. A non-transitory computer readable medium, comprising an information management program to be used in an information management device, the program causing a computer to execute:

obtaining communication information about a communication state in an internal network inside a building;

determining whether or not to start an updating process based on the obtained communication information, the updating process being for storing information obtained from an external network outside the building as local information into a storage device included in the internal network; and determining whether or not to permit access from a terminal device to the external network, wherein when the access from the terminal device to the external network is not permitted and target information to be accessed by the terminal device is stored in the storage device, the information management device performs a secondary process of allowing the terminal device to obtain the target information in the storage device, the internal network includes:

a first table storing site information indicating a site included in the external network;

a second table storing a word searched on the external network by the terminal device; and a third table storing a site being a reception target from which information to be stored as the local information is received, in accordance with priority representing urgency and/or importance, and the updating process includes:

determining whether or not the site indicated by the site information stored in the first table is the reception target, based on whether or not information obtained from the site includes the word stored in the second table;

providing priority to the site determined to be the reception target and creating the third table including the site determined to be the reception target and not including the site determined not to be the reception target; and receiving, from the site being the reception target, information that includes the word stored in the second table and storing the received information as the local information into the storage device.

9. A non-transitory computer readable medium, comprising an information management program to be used in a local network system, the local network system including a network management device and a local information management device, the program causing a computer to execute:

the network management device obtaining communication information about a communication state in an internal network inside a building;

the network management device transmitting a data update starting request to the local information management device based on the obtained communication information;

the local information management device receiving the data update starting request and starting an updating process for storing information obtained from an external network outside the building as local information into a storage device included in the internal network; and the network management device determining whether or not to permit access from a terminal device to the external network, wherein when the access from the terminal device to the external network is not permitted and target information to be accessed by the terminal device is stored in the storage device, the network management device performs a secondary process of allowing the terminal device to obtain the target information in the storage device, the internal network includes:

a first table storing site information indicating a site included in the external network;

a second table storing a word searched on the external network by the terminal device; and a third table storing a site being a reception target from which information to be stored as the local information is received, in accordance with priority representing urgency and/or importance, and the updating process includes:

determining whether or not the site indicated by the site information stored in the first table is the reception target, based on whether or not information obtained from the site includes the word stored in the second table;

providing priority to the site determined to be the reception target and creating the third table including the site determined to be the reception target and not including the site determined not to be the reception target; and receiving, from the site being the reception target, information that includes the word stored in the second table and storing the received information as the local information into the storage device.

* * * * *